(12) United States Patent
Smith

(10) Patent No.: US 7,289,991 B2
(45) Date of Patent: Oct. 30, 2007

(54) APPARATUS, SYSTEM, AND METHOD FOR SORTING CHARACTER REPRESENTATIONS OF DATA

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/861,732

(22) Filed: Jun. 4, 2004

(65) Prior Publication Data

US 2005/0278330 A1    Dec. 15, 2005

(51) Int. Cl.
*G06F 7/00*    (2006.01)
*G06F 17/30*   (2006.01)
*G06F 17/00*   (2006.01)

(52) U.S. Cl. .......................................... 707/7; 707/102
(58) Field of Classification Search ................ 707/100, 707/103, 1, 6, 7, 101
See application file for complete search history.

(56) References Cited

U.S. PATENT DOCUMENTS

| | | | | |
|---|---|---|---|---|
| 4,510,567 | A |  | 4/1985 | Chang et al. ................ 364/300 |
| 5,929,792 | A | * | 7/1999 | Herriot ......................... 341/55 |
| 5,963,155 | A |  | 10/1999 | Cheng et al. ................. 341/90 |
| 6,003,028 | A |  | 12/1999 | Koenig ........................... 707/6 |
| 6,076,084 | A | * | 6/2000 | Harlan ............................ 707/1 |
| 6,353,887 | B1 |  | 3/2002 | Cotugno et al. ............. 713/165 |
| 6,389,385 | B1 |  | 5/2002 | King ............................. 703/27 |
| 6,408,405 | B1 |  | 6/2002 | McDonald et al. ............ 714/39 |
| 6,421,680 | B1 | * | 7/2002 | Kumhyr et al. ................. 707/6 |
| 6,449,610 | B1 |  | 9/2002 | Balfour ........................... 707/6 |
| 2001/0037337 | A1 |  | 11/2001 | Maier et al. ................. 707/101 |
| 2002/0165901 | A1 |  | 11/2002 | Rajan et al. ................. 709/201 |
| 2003/0167357 | A1 |  | 9/2003 | Goode .......................... 709/328 |
| 2004/0237046 | A1 | * | 11/2004 | Burchall et al. ............. 715/531 |
| 2005/0251519 | A1 | * | 11/2005 | Davis .......................... 707/100 |
| 2005/0278330 | A1 | * | 12/2005 | Smith ............................. 707/7 |

OTHER PUBLICATIONS

Golob Sam, "MVS Tools and Tricks: EBCDIC to ASCII", Jul. 2001, Technical Support; www.naspa.com.

* cited by examiner

*Primary Examiner*—Apu Mofiz
*Assistant Examiner*—Jared M Bibbee
(74) *Attorney, Agent, or Firm*—Kunzler & McKenzie

(57) ABSTRACT

An apparatus, system, and method are disclosed for sorting character representations of data under the present invention, a character-encoded sort data value is identified in a data line of a data set. The sort data value is a character encoding of a predefined numbering system such as hexadecimal or binary encoding. The sort data value is then converted to a predefined encoding scheme and the data set is sorted based on the converted sort data value. A cycle number may be appended to the sort data value to maintain the order of the sort data values when the sort data values wrap. One embodiment identifies and removes delimiters such as titles from the data set and are inserted into the sorted data set.

15 Claims, 6 Drawing Sheets

200

- 120 — DATA LOG
- 140a — PAGE 1
- 140b — PAGE 2
- 220 — 0A CE80
  - 0B 436D
- 240 — 01 EE92
  - 03 C43E
  - 04 52A1
  - 06 53B1
- 260 — FA A742
  - FD 1B91
  - FE 7249
- 280 — F8 F5E7
  - F9 04D3

130 brackets 220–240 range; 110 brackets 260–280 range.

(Prior Art)

120 — DATA LOG
140a — PAGE 1

F8 F5E7
720a — F9 04D3
740a — FA A742
FD 1B91
760 — FE 7249

780 — 01 EE92
03 C43E
04 52A1

140b — PAGE 2
720b — 06 53B1
740b — 0A CE80
0B 436D

FIG. 7

APPARATUS, SYSTEM, AND METHOD FOR SORTING CHARACTER REPRESENTATIONS OF DATA

BACKGROUND OF THE INVENTION

1. Field of the Invention

This invention relates to sorting data and more particularly relates to sorting character representations of numeric data.

2. Description of the Related Art

Data sets often include an encoding scheme other than a character encoding scheme that may be displayed in a form easily recognized by a user. For example, a data set may include a predefined numbering system such as a hexadecimal number system and a binary number system. The user often converts data in the predefined numbering system to a character representation for analysis. Data sets may include database records, log records, trace records, and system dump records. Numeric data values of the data set are frequently converted to a character representation by formatting tools to improve readability. Typically, the data set is presented to a user in a series of data lines. Formatting tools generally sort the data lines using raw data (data not converted to a character representation) for one or more data values and add delimiter information including titles, page headers, page footers, and the like.

Unfortunately, if a user requires that the data lines of a data set be sorted in an alternate manner or using an alternate data value as a sort handle, the data lines often do not sort correctly because the character representations of the data values are not ordered the same as the data in the original number system. For example, the character representation of the hexadecimal value 'F9'x (249) is 'F9'. To sort this data, the hexadecimal value for the character representation is sorted on the computer. In one example using the Extended Binary Coded Decimal Interchange Code (EBCDIC) character set, the value 'C6F9'x represents 'F9.' So, the computer sorts using the value 'C6F9'x for 'F9'x (249). Similarly, 'C6C1'x is used to sort the character representation 'FA' (250) of hexadecimal value 'FA'x. Thus, although 'F9' should precede 'FA' in an ascending sort, 'FA' will in fact precede 'F9' because 'C6C1'x precedes 'C6F9'x. In addition, titles, page headers, and page footers can also be sorted into arbitrary and useless positions in the data set.

FIG. 1 illustrates a conventional presorted data set 100. A formatting tool has added a title 120, and one or more page headers 140 to a plurality of data lines 150. Generally, the formatting tool sorts the data lines 150 according to some fixed sort criteria. Each data line 150 includes at least one data value 160 that may be selected as a sort data value 160 and may also contain at least one data value 170 that is not selected as a sort data value.

In a hypothetical situation, the sort data value 160 is a character representation of hexadecimal data. Also the sort data values 110 wrap around from a large value of a set of sequentially ordered values to resume sequential ordering with sort data values 130 from near the beginning of the set of sequentially ordered values. In other words, the sort data value 160 has a fixed number of digits. Consequently, as the sequence numbers of the sort data value 160 exceed the highest value that can be represented with the fixed number of digits, the value in the sort data value wraps back to all zeros for each digit. This wrapping is easily conceptualized using a conventional odometer as an example. Once all places on the odometer reach a 9 digit, the odometer wraps to all zeros.

The numerically larger sort data values 110 are referred to herein as pre-wrap sort data values 110 and the numerically smaller sort data values 130 subsequent to the wrap are referred to herein as post-wrap sort data values 130. Although the pre-wrap sort data values 110 are numerically larger than the post-wrap sort data values 130, the pre-wrap sort data values 110 represent data values that occur sequentially before the post-wrap sort data values 130. The data values of the pre-wrap sort data values 110 reach a maximum value and wrap to resume sequencing at the lower numeric values of the post-wrap sort data values 130.

FIG. 2 illustrates a sorted data set 200. In the depicted sorted data set 200, a user has sorted the presorted data set 100 of FIG. 1 by the sort data value 160. The sort data values 220, 260 containing the character representations of the hexadecimal digits A-F incorrectly sort ahead of the sort data 240, 280 containing the character representations of hexadecimal digits 0-9. The post-wrap sort data values 130 precede the pre-wrap sort data values 110, although as explained in FIG. 1, the pre-wrap sort data values 110 sequentially should come before the post-wrap sort data values 130 in precedence. Although the user might prefer to retain the title 120 and pager headers 140 in the positions each occupied relative to the beginning of the report and the beginning of each page, the title 120 and the page headers 140 are grouped at the beginning of the data set. Thus, the data lines 150 of the sorted data set 200 are not sorted properly.

From the foregoing discussion, it should be apparent that a need exists for an apparatus, system, and method that sort character representations of sort data values in data sets consistent with the original numeric encoding. The apparatus, system, and method should retain the original formatting including properly placed delimiters of the presorted data sets. In addition, there exists a need for an apparatus, system, and method that sorts pre-wrap and post-wrap data values.

SUMMARY OF THE INVENTION

The present invention has been developed in response to the present state of the art, and in particular, in response to the problems and needs in the art that have not yet been fully solved by currently available data set sorting methods. Accordingly, the present invention has been developed to provide an apparatus, system, and method for sorting character representations of numeric data that overcome many or all of the above-discussed shortcomings in the art.

The apparatus for sorting character representations of data is provided with a logic unit containing a plurality of modules configured to functionally execute the steps of sorting data. These modules in the described embodiments include an identity module, a conversion module, and a sort module.

The identity module identifies a character-encoded sort data value in a plurality of data lines of a data set. The data set may include database records, log records, trace records, system dump records, or the like. The sort data value comprises a character representation of numeric data of a predefined numbering system encoded according to a predefined character set. The predefined numbering system is a number system having a certain number base (i.e., binary, hexadecimal, octal, etc.) The sort data value may be automatically detected. Alternatively, a user designates the sort data value in the data line.

The conversion module converts the sort data value from the character representation to a numeric representation according to a predefined encoding scheme. Preferably, the predefined encoding scheme is the original predefined encoding scheme of the data in the sort data value used to generate the character representation. In an alternate embodiment, the conversion module converts the sort data value to a predefined encoding scheme other than the original predefined encoding scheme. The sort module sorts the data lines of the data set using the converted sort data value.

A system of the present invention is also presented to sort character representations of data. The system may be embodied as a data processing system. In particular, the system, in one embodiment, includes a memory, a processor, and an output device. The processor comprises an identity module, a conversion module, and a sort module. The identity module identifies a character-encoded sort data value in a plurality of data lines of a data set. In addition, the conversion module converts the sort data value from a character representation to a predefined encoding scheme and stores the converted data of the sort data value in an identity data value. The identity data value is temporarily appended to each data line. The sort module sorts the data lines by the identity data value. The identity data value may be discarded after the sort. The sort module may render the sorted data set on the output device. The output device may be a printer, a display, or the like.

A method of the present invention is also presented for sorting character representations of data. The method in the disclosed embodiments substantially includes the steps necessary to carry out the functions presented above with respect to the operation of the described apparatus and system. The identity module identifies a character-encoded sort data value in a data set. The conversion module converts the sort data value to a predefined encoding scheme. The sort data value may originally be a fixed-digit data value of a predefined numbering system such as hexadecimal numbering.

In one embodiment, the conversion module appends a cycle number to the sort data value as the most significant value of the to the sort data value. The cycle number functions as the most significant value of the sort data value and differentiates pre-wrap sort data values and post-wrap sort data values during a sort. The cycle number may be used to order sort data values occurring prior to and subsequent to a wrap of sort data values. Thus the first sort data value would be sorted as preceding the second sort data value. The method may assign the cycle number an initial value.

In one embodiment, the method calculates an absolute value of the difference between a first data value for a first sort data value of a first data line and a second data value of a second data line. The conversion module may increment the cycle number by an increment value if the first sort data value exceeds the second sort data value and if the absolute value of the difference exceeds a next-wrap threshold. In one embodiment, the conversion module decrements the cycle number by the increment value if the second sort data value exceeds the first sort data value and the absolute value of the difference exceeds a pre-wrap threshold.

In one embodiment, the sort module identifies a delimiter and a delimiter offset. The delimiter may be a title, a page header, and a page footer. The delimiter offset may be the delimiter's relative location in a rendered data set. For example, the title may be the first line in the data set and the delimiter offset of the title may be zero (0) from the beginning of the data set. The sort module may remove the title from the data set. Then the sort module sorts the data set and re-inserted the delimiter in the data set using the delimiter offset in the sorted data set. For example, the title may be re-inserted in the data set with the offset of zero (0) from the beginning of the data set.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The apparatus, system, and method sorts character representations of numerical data in a data set as converted sort data values and retains the original formatting including properly placed delimiters of the presorted data set. In addition, the apparatus, system, and method sort pre-wrap and post-wrap sort data values including intermingled pre-wrap and post-wrap sort data values. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a representation of data set sorted by a character-encoded representation of numeric data;

FIG. 7 is a representation of one embodiment of data set sorted in accordance with the present invention.

DETAILED DESCRIPTION OF THE INVENTION

Figure 1:
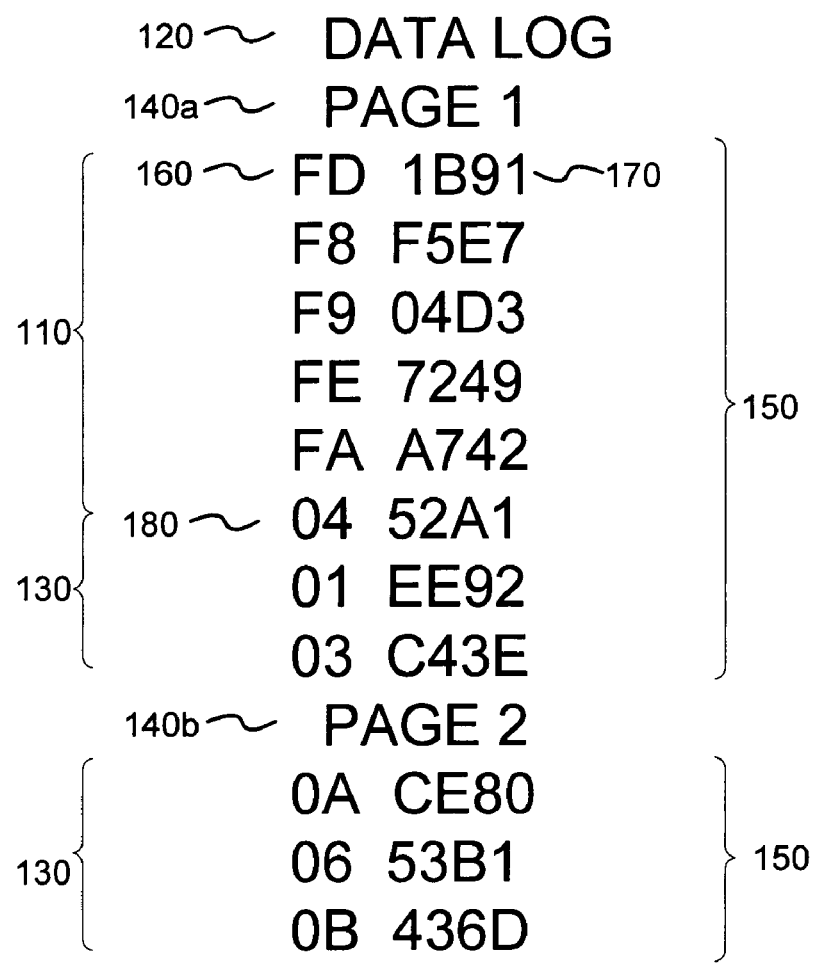
FIG. 1 is a representation of data set sorted according to fixed sort criteria.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as data value programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 3:
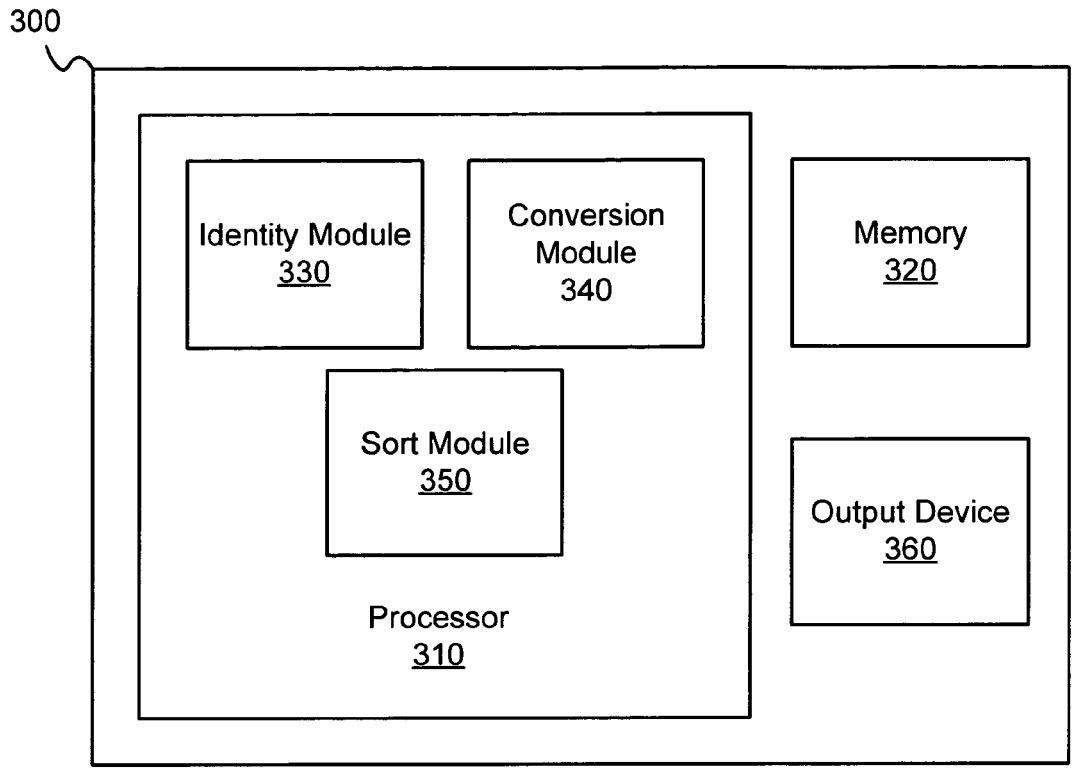
FIG. 3 is a block diagram illustrating one embodiment of a sorting system in accordance with the present invention.

FIG. 3 illustrates one embodiment of a sorting system 300 of the present invention. The sorting system 300 is adapted to sort data sets including a data set that was originally numerically encoded such as database records, log records, trace records, system dump records, and the like. A user may subsequently convert the numeric data to a character encoding as part of a report for ease of viewing and analysis. Certain numeric data such as hexadecimal numbers may be converted to characters representing the same hexadecimal digits. So '9'x is represented by the character '9.' The report may include titles, pager header, pager footers and other delimiters. In addition, the data set may be stored in the character-encoded form.

The user may desire to sort the data set subsequent to the data set's conversion to the character-encoded format. However, some of the converted sort data values may sort differently as a character encoded representation than in the sort data values' original encoding scheme. For example, when the hexadecimal numbers 'A'x (10) through 'F'x (15) are encoded in Extended Binary Coded Decimal Interchange Code (EBCDIC), the character encoded representation of the hexadecimal number 'A'x through 'F'x have precedence in an ascending sort over the character encoded representations of the hexadecimal numbers '0'x through '9'x. Typically this is due to character set used to convert between numeric data and character representations. Thus sorting the data set by the character encoded sort data values incorrectly sorts the data lines of the data set relative to the original encoding scheme of the sort data values.

The sorting system 300 as depicted includes a memory 320, a processor 310 and an output device 360. The processor 310 comprises an identity module 330, a conversion module 340, and a sort module 350. The output device 360 may comprise a printer, a monitor, or the like. The identity module 330 identifies a character-encoded sort data value in a plurality of data lines of the data set. Each data line of the data set includes the sort data value. The sort data value may function as a sort handle, the data value associated with a group of data such as a data line. By ordering the sort data value, each data line in a data set may be ordered. For example, the data sort value may be a time value. By sorting the time values, the data associated with each time value is ordered in chronological order.

The sort data value comprises a character representation of numeric data of a predefined numbering system. The character representation is derived using a predefined character set such as Extended Binary Coded Decimal Interchange Code (EBCDIC). In one embodiment, the predefined numbering system is hexadecimal encoding. In an alternate embodiment, the predefined encoding scheme is binary encoding.

A user may designate a sort data value to the identity module 330 using a parameter or user interface. The identity module 330 identifies the sort data value and the conversion module 340 converts the sort data value from a character representation to a predefined encoding scheme according to the predefined character set. In one embodiment, the conversion module 340 stores the converted sort data value in an identity data value. The identity data value may be a temporary data value that is used to sort the data lines of the data set. The identity data value may be modified without modifying the source sort data value. In a certain embodiment, the identity data value is appended to each data line. The sort module 350 sorts the data lines of the data set by the identity data value. Once sorted, the identity data values may be discarded.

The processor 310 may render the sorted data set using the output device 360. In one embodiment, the conversion module 340 converts the sort data value back to the predefined character set and renders the original character representation of the sort data value. The sorting system 300 allows the sorting of data sets according to character-encoded numeric data values.

Figure 4:
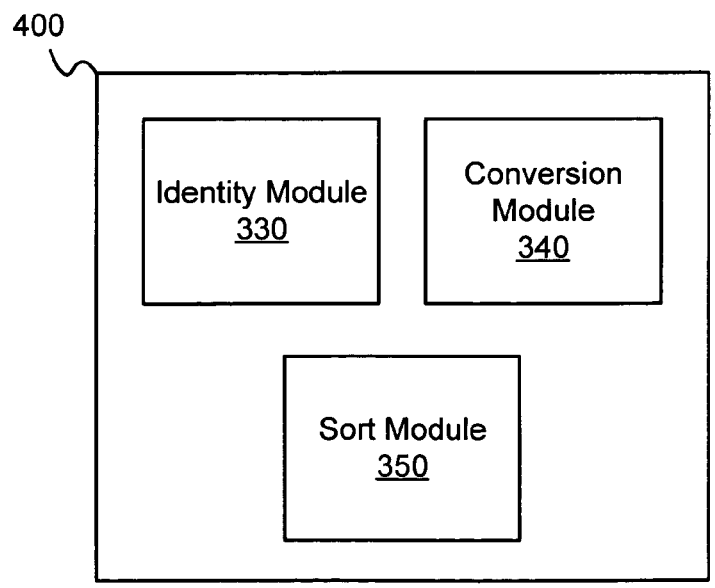
FIG. 4 is a block diagram illustrating one embodiment of a sorting apparatus of the present invention.

FIG. 4 is a block diagram illustrating one embodiment of a sorting apparatus 400 of the present invention. The sorting apparatus 400 sorts a data set and includes an identity module 330, a conversion module 340, and a sort module 350. The identity module 330 identifies a character-encoded sort data value for each data line of the data set. In one embodiment, the user provides one or more parameters specifying the location of the sort data value in the data line.

The conversion module 340 converts the sort data value from the character representation to a predefined encoding scheme. Preferably, the predefined encoding scheme is the original predefined encoding scheme of the data in the sort data value used to generate the character representation. In an alternate embodiment, the conversion module 340 converts the sort data value to a predefined encoding scheme other than the original predefined encoding scheme.

For example, the original sort data values may be encoded in as hexadecimal numbers prior to conversion to character encoding such as EBCDIC. The conversion module 340 may convert the character encoded sort data values to an alternate predefined encoding scheme, such as decimal numbering. In one embodiment, the user selects the predefined encoding scheme.

The sort module 350 sorts the data lines of the data set by the converted sort data value. In one embodiment, the sort module 350 sorts the sort data values in ascending order. For example, '7' is sorted before '8' in an ascending sort order. In an alternate embodiment, the sort module 350 sorts the sort data values in descending value. For example, '4' is sorted before '2' in a descending sort order.

The sorting apparatus 400 sorts character-encoded sort data values by converting the character-encoded sort data values to a predefined encoding scheme such as hexadecimal numbers. The sort data values may be sorted to order the character-encoded sort data values in accordance with the original numeric numbering system of the sort data values. Thus in one embodiment, the hexadecimal '9'x (9) would have precedence over the hexadecimal 'A'x (10), although the EDCDIC representation of 'A'x (10) had precedence over the EDCDIC representation of '9'x (9) in the data set.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
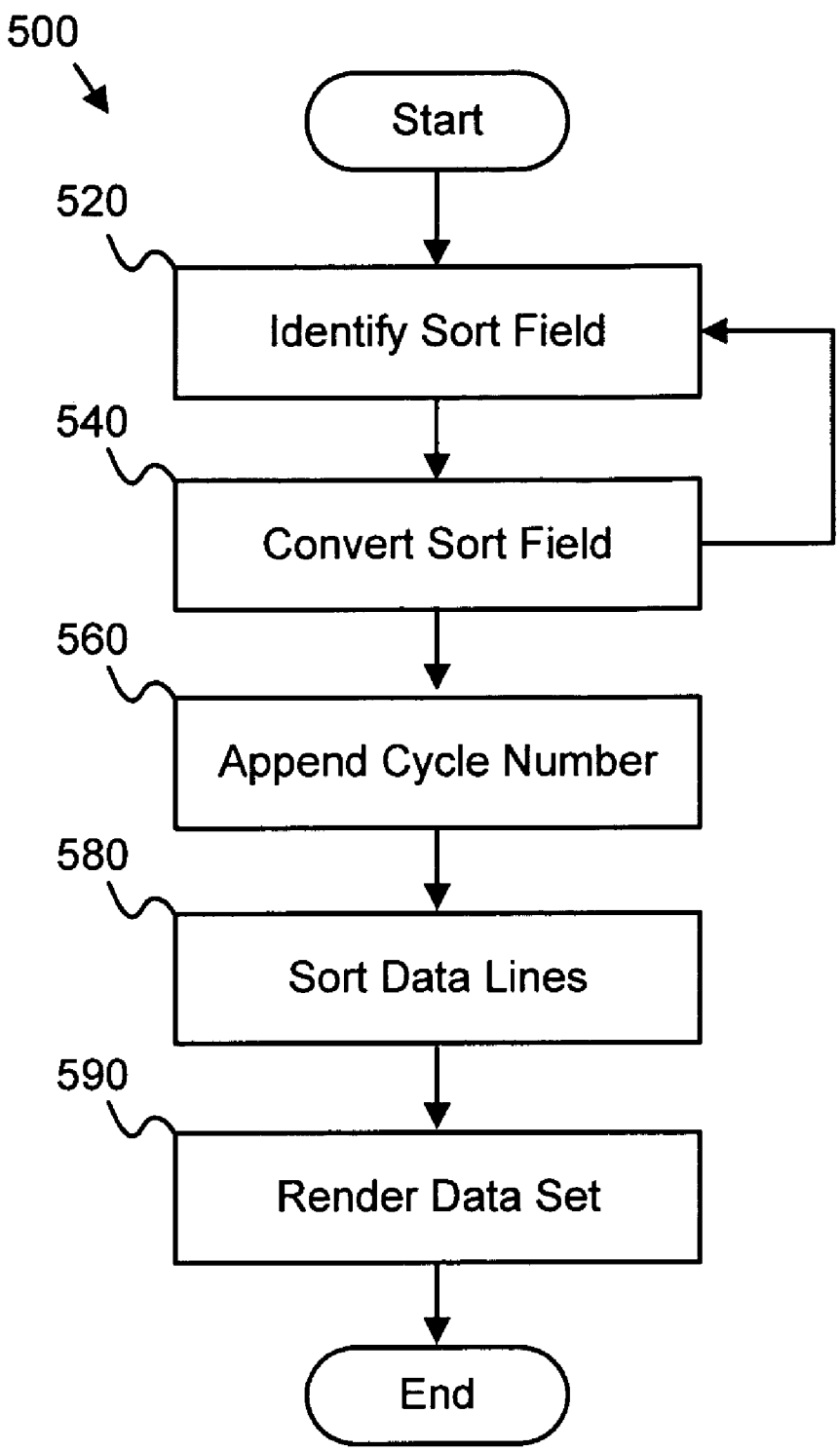
FIG. 5 is a flow chart diagram illustrating one embodiment of a sorting method in accordance with the present invention.

FIG. 5 is a schematic flow chart diagram illustrating one embodiment of a sorting method 500 of the present invention. The identity module 330 identifies 520 a character-encoded sort data value in a data set. Typically, the sort data value comprises a field or column in each data line of a data set. In one embodiment, a user specifies the sort data value. The conversion module 340 converts 540 the sort data value to a predefined encoding scheme. The converted sort data value may be a fixed-digit sequential data value.

In one embodiment, the conversion module 340 appends 560 a cycle number to the sort data value. The conversion module 340 appends 560 the cycle number as the most significant value of the sort data value. Most significant value as used herein refers to one or more most significant digits. The conversion module 340 appends 560 the cycle number to order sort data values when one or more sort data values have wrapped. Data values with fixed numbers of digits may wrap when a data value in the set of sequential data values reaches a maximum value. Thus in a set of two digit data values the data value '99' may be followed by the data value '00' as the data values wrap to the beginning of the sequential order to accommodate ordering data values beyond the range of the available digits. The data value '99' should have precedence over the subsequent '00', although in a regular ascending sort that does not accommodate wrapping, '00' would have precedence over '99'

The cycle number functions as a most significant value that can be used to differentiate pre-wrap sort data values and post-wrap sort data values during a sort. For example, if a first hexadecimal sort data value 'FF'x (255) is followed by a second hexadecimal sort data value '00'x (00) where the second sort data value occurred after a wrap of the sequence of sort data values from 'FF'x to '00'x (00), the conversion module 340 may append '00'x (00) to the first sort data value to form '00FF'x (255) and append '01'x (01) to the second sort data value to form '0100' (256). Thus the first sort data value would sort before the second sort data value because the cycle number is included in the sorting of the sort data value. The conversion module 340 may increment the cycle number by an increment value each time the sort data values wrap. In one embodiment, the increment value is one.

In addition to pre-wrap and post-wrap sort data values occurring sequentially, pre-wrap and post-wrap sort data values may be intermingled. In one embodiment, the conversion module 340 modifies the cycle number to differentiate intermingled pre-wrap sort data values and post-wrap sort data values. To modify the cycle number, the conversion module 340 may calculate the absolute value of the difference between a first data value of a first sort data line and a second sort data value of a second data line. The absolute value of the difference is used to modify the cycle number to adjust for the wrapping of data sort values.

In one embodiment, the conversion module 340 increments the cycle number by the increment value if the first data value exceeds the second data value and if the difference exceeds a next-wrap threshold. The next-wrap threshold is a predefined data value selected to identify pre-wrap and post-wrap data values in a set of data values. For example, in the ordered set of data values 'F8'x (248), 'F1'x (241), '02'x (02), and 'FA'x (250) each element of the set is assumed to be grouped in approximately a sequential order although with some deviation to the sequential order. Thus the relative positions of a first element of the data set provides information on the first element's position relative to other elements, although the first element may not be in precisely sequential order relative to the other elements.

In the example above, '02'x (02) may be assumed to be grouped near to 'F1 'x (241) and 'FA'x (250) because '02'x (02) shares approximately the ordered position of 'F1'x (241) and 'FA'x (250) instead of '02'x (02) having an ordered position far removed from 'F1'x (241) and 'FA'x (250). In the exemplary data set above, 'F1'x (241) is the first sort data value and '02'x (02) is the second sort data value. The conversion module 340 uses pre-wrap and post-wrap thresholds to identify sort data values that should be grouped in sequential proximity to logically adjacent sort data values such as 'F1 'x (241) and '02'x (02) but that appear to be sequentially distant because of the wrapping of the sort data value digits. In addition, the data set may have been sorted by an alternate sort data value, intermingling sort data values.

For example, the pre-wrap and post-wrap thresholds may be "10"x (16), the cycle number may be '00'x (00), and the increment value may be '01'x (01) for the exemplary data set. Thus the absolute value of the difference between 'F1 'x (241) and '02'x (02) is 'EF'x (239). Because the absolute value of the difference 'EF'x (239) exceeds the next-wrap threshold of '10'x (16) and the first data value 'F1 'x (241) exceeds the second data value '02'x (02), the conversion module 340 increments the cycle number '00'x (00) to '01'x (01) and appends 560 the incremented cycle number '01'x (01) to the second sort data value '02'x (02) so that the appended second data value '0102'x (258) will be ordered subsequent to the sort data value of the appended first data value '00F1 'x (241). Thus the second sort data value '02'x (02) that appears to precede the first sort data value 'F1'x (241) because the second sort data value '02'x (02) wrapped will be sorted subsequent to the first sort data value '00F1 'x (241).

In one embodiment, the conversion module 340 decrements the cycle number by the increment value if the second data value exceeds the first data value and the difference exceeds a pre-wrap threshold. In the example using hexadecimal numbers of the exemplary data set, the first data value is '02'x , (02), the second data value is 'FA'x (250), the cycle number is '01'x (01), and the pre-wrap and post-wrap threshold is '10'x (16). In addition, the appended first sort datavalue is '0102'x (258) as calculated previously. The absolute value of the difference between the first data value '02'x, (02) and the second data value 'FA'x (250) is 'F8'x (248) and exceeds the pre-wrap threshold '10'x (16).

The conversion module 340 may determine that the second data value 'FA'x (250) should be ordered prior to the first data value because the second data value exceeds the first data value, and because the absolute value of the difference exceeds the post-wrap threshold. Thus the conversion module 340 decrements the cycle number by the increment value of '01'x (01) so that the cycle number is '00'x (00). In addition, the conversion module 340 appends 560 the cycle number to the second data value, the second data value becoming '00FA'x (250). Thus the appended first sort data value '0102'x is preceded by the appended second data sort value '00FA'x (250) when sorted. The conversion module 340 identifies sort data values that are in sequential proximity but that appear sequentially distant and adjusts the cycle number appended 560 to the sort data values so that the appended sort data values sort to the proper sequence.

The sort module 350 sorts 580 the data lines of the data set by the converted data value in the sort data value. In one embodiment, the converted sort data value is the appended sort data value. For example, using the previous exemplary data set, the sort module 350 sorts 580 the sort data value '02'x (02) as '0102'x (258). In one embodiment, the sort module 350 renders 590 the sorted data set. In a certain embodiment, the sort module 350 may render 590 each sort data value with the appended cycle number. The sort module 350 may also render 590 each sort data value without the appended cycle number. The sorting method 500 sorts a character-encoded data set using a converted sort data value as the sort handle.

Figure 6:
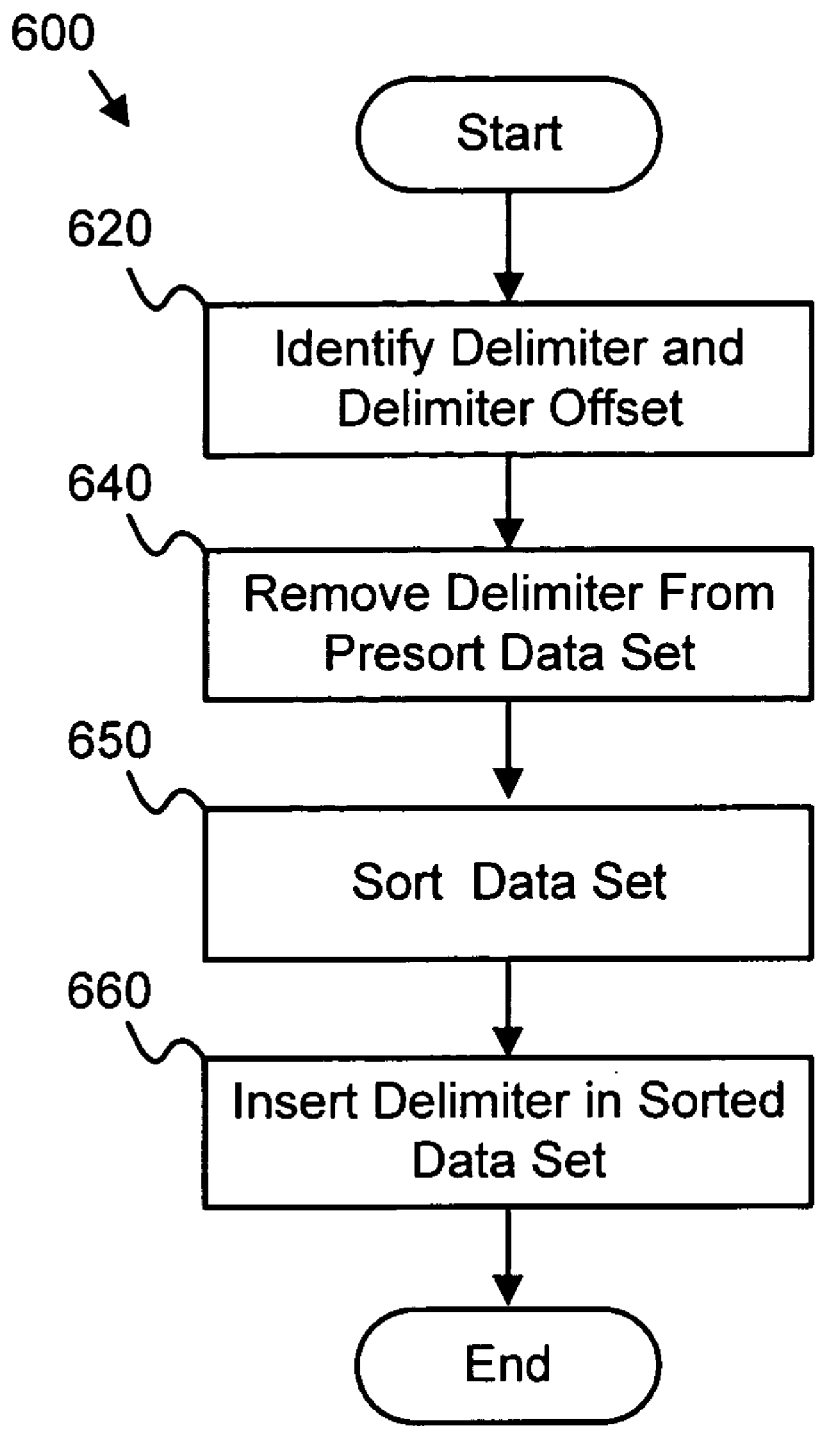
FIG. 6 is a flow chart diagram illustrating one embodiment of a delimiter relocation method of the present invention.

FIG. 6 is a schematic flow chart diagram illustrating one embodiment of a delimiter relocation method 600 of the present invention. The delimiter relocation method 600 may be included in the sorting method 500 illustrated in FIG. 5. The sort module 350 identifies 620 a delimiter and a delimiter offset. The delimiter may be a title, a page header, and a page footer. The delimiter offset may be the delimiter's relative location in a rendered data set from the beginning of the data set or from another reference point. For example, the title may be the first line in the data set and have a delimiter offset of zero (0) from the beginning of the data set, the page header may be first line of a rendered data set page and have a delimiter offset of zero (0) from a page break, and the page footer may be the fiftieth line of the rendered data set page and have a delimiter offset of forty-nine (49) from the page break. In one embodiment, a user supplies a delimiter identifier to the sort module 350. For example, the delimiter identifier may be text common to one or more delimiters such as the text word "Page." The sort module 350 may scan a data line for the text word "Page." If "Page" is not found, the data line is a data line with a delimiter. In one embodiment, the scan module 350 scans the data set once for each delimiter identifier. The sort module 350 may identify 620 a delimiter such as the character encoded text line "System Log Page 4" using the delimiter identifier "Page."

The sort module 350 removes 640 the delimiter from the character-encoded data set. In one embodiment, sort module 350 stores the delimiter and the delimiter offset. The sort module 350 then sorts 650 the data set. In one embodiment, the sort module 350 sorts the data set using the sorting method 500 of FIG. 5. The sort module 350 inserts 660 the delimiter in the sorted data set using the delimiter offset. For example, the sort module 350 may insert 660 the title as the first line in the rendered sorted data set with a delimiter offset of zero (0) from the beginning of the data set, the page header as the first line in a rendered sorted data set page with a delimiter offset of zero (0) from the page break, and the page footer as the last line of the rendered sorted data set page with a delimiter offset of forty-nine (49). The sort module 350 removes 640 delimiters from a data set and reinserts 660 the delimiters in the sorted data set such that the delimiters provide useful information.

FIG. 7 is a schematic flow chart diagram illustrating one embodiment of sorted data set 700 of the present invention. The depicted sorted data set 700 represents the presorted data set 100 depicted in FIG. 1 subsequent to the application of the sorting method 500 illustrated in FIG. 5.

The sorted data set 700 includes delimiters such as the title 120 and the page header 140 located in appropriate positions. Referring to the least significant hexadecimal value in the sort data values, the sort data values 720 with the digits 0-9 precede the sort data values 740 with the digits A-F. The pre-warp sort data values 110 also precede the post-wrap sort data values 130 although the hexadecimal values of the post-wrap sort data values 130 are greater than the hexadecimal values of the pre-wrap sort data values 110.

The present invention sorts character representations of numerical data in data sets as converted sort data values 720, 740 and retains the original formatting including properly placed delimiters of the presorted data set. In addition, the present invention sorts pre-wrap and post-wrap sort data values 110, 130 including intermingled pre-wrap sort data values 110 and post-wrap sort data values 130. For example, 'FE'760 is before '01' 780, although in an ascending sort '01' 780 would come before 'FE' 760.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to sort character representations of data, the apparatus comprising:
   an identity module configured to identify character-encoded sort data values in a plurality of data lines of a data set wherein each data line has one sort data value, the sort data values comprising a character representation of hexadecimal fixed-digit numeric data encoded according to an Extended Binary Coded Decimal Interchange Code set such that each character digit in the character representation corresponds to a hexadecimal numeric digit, wherein the sort data values comprise fixed-digit sequential data;
   a conversion module configured to convert the sort data values from the character representation to hexadecimal fixed-digit numeric data and append a cycle number to the sort data value as a most significant value, the cycle number representative of a subsequent set of sequential data for which the value is greater than sequential data within a previous set of sequential data such that the sort data values wrap, the sets of sequential data defined by the fixed-digit size of the sort data value; and
   a sort module configured to sort the data lines using the converted sort data and render the sorted data lines on an output device.

2. The apparatus of claim 1, wherein the conversion module is further configured to calculate an absolute value of the difference between a first sort data value of a first data line and a second sort data value of a second data line and to increment the cycle number of the second sort data value by an increment value in response to the first sort data value exceeding the second sort data value and the absolute value of the difference exceeding a next-wrap threshold and to further decrement the cycle number of the second sort data value by the increment value in response to the second sort data value exceeding the first sort data value and the difference exceeding a pre-wrap threshold.

3. The apparatus of claim 2, wherein the conversion module is further configured to calculate the pre-wrap threshold and the next-wrap threshold from the fixed-digit size of the first sort data value.

4. The apparatus of claim 1, the sort module further configured to:
   identify a delimiter and a delimiter offset within the plurality of data lines of a data set;
   remove the delimiter from the data set; and
   insert the delimiter into the sorted data lines in accordance with the delimiter offset.

5. The apparatus of claim 4, wherein the sort module is further configured to receive delimiter identifiers.

6. A system to sort character representations of data, the system comprising:
   a memory configured to store and retrieve data;
   a processor having,
      an identity module configured to identify character-encoded sort data values in a plurality of data lines of a data set wherein each data line has one sort data value, the sort data values comprising a character representation of hexadecimal fixed-digit numeric data encoded according to an Extended Binary Coded Decimal Interchange Code set such that each character digit in the character representation corresponds to a hexadecimal numeric digit, wherein the sort data values comprise fixed-digit sequential data;
      a conversion module configured to convert the sort data values from the character representation to hexadecimal fixed-digit numeric data, append a cycle number to the sort data value as a most significant value, the cycle number representative of a subsequent set of sequential data for which the value is greater than sequential data within a previous set of sequential data such that the sort data values wrap, the sets of sequential data defined by the fixed-digit size of the sort data value, and store the converted sort data as an identity data value;
      a sort module configured to sort the data lines using the identity data value; and
      an output device configured to render the sorted data set.

7. The system of claim 6, the conversion module further configured to calculate an absolute value of the difference between a first identity data value of a first data line and a second identity data value of a second data line and to increment the cycle number of the second identity data value by an increment value in response to the first identity data value exceeding the second identity data value and the absolute value of the difference exceeding a next-wrap threshold and to further decrement the cycle number of the second identity data value by the increment value in response to the second identity data value exceeding the first identity data value and the absolute value of the difference exceeding a pre-wrap threshold.

8. The system of claim 7, the conversion module further configured to calculate the pre-wrap threshold and the next-wrap threshold from the fixed-digit size of the first identity data value.

9. The system of claim 8, the sort module further configured to:
   identify a delimiter and a delimiter offset within the plurality of data lines of a data set;
   remove the delimiter from the data set; and
   insert the delimiter into the sorted data lines in accordance with the delimiter offset.

10. A computer-readable storage medium tangibly embodying a program of machine-readable instructions executable by a digital processing apparatus to perform operations to sort character representations of data, the operations comprising:
    identifying a character-encoded sort data value in a plurality of data lines of a data set wherein each data line has one sort data value, the sort data value comprising a character representation of hexadecimal fixed-digit numeric data encoded according to an Extended Binary Coded Decimal Interchange Code set such that each character digit in the character representation corresponds to a hexadecimal numeric digit, wherein the sort data values comprise fixed-digit sequential data;
    converting the sort data value from the character representation to data encoded according to hexadecimal fixed-digit numeric data;
    appending a cycle number to the sort data value as a most significant value, the cycle number representative of a subsequent set of sequential data for which the value is greater than sequential data within a previous set of sequential data such that the sort data values wrap, the sets of sequential data defined by the fixed-digit size of the sort data value;
    sorting the data lines using the converted sort data value; and
    rendering the sorted data lines on an output device.

11. The computer-readable storage medium of claim 10, wherein the instructions further comprise operations to calculate an absolute value of the difference between a first sort data value of a first data line and a second sort data value of a second data line and to increment the cycle number of the second sort data value by an increment value in response to the first sort data value exceeding the second sort data value and the absolute value of the difference exceeding a next-wrap threshold and to further decrement the cycle number of the second sort data value by the increment value in response to the second sort data value exceeding the first sort data value and the absolute value of the difference exceeding a pre-wrap threshold.

12. The computer-readable storage medium of claim 11, wherein the instructions further comprise operations to selectively calculate the pre-wrap threshold and the next-wrap threshold from the fixed-digit size of the first sort data value.

13. The computer-readable storage medium of claim 10, wherein the instructions further comprise operations to:

identify a delimiter and a delimiter offset within the plurality of data lines of a data set;

remove the delimiter from the data set; and insert the delimiter into the sorted data lines in accordance with the delimiter offset.

14. The computer-readable storage medium of claim 13, wherein the instructions further comprise operations to receive delimiter identifiers.

15. The computer-readable storage medium of claim 14, wherein the instructions further comprise operations to prompt a user to confirm a valid delimiter.

* * * * *